US007188342B2

(12) United States Patent
DeMello et al.

(10) Patent No.: US 7,188,342 B2
(45) Date of Patent: Mar. 6, 2007

(54) SERVER CONTROLLED BRANDING OF CLIENT SOFTWARE DEPLOYED OVER COMPUTER NETWORKS

(75) Inventors: Marco A. DeMello, Redmond, WA (US); Attila Narin, Bothell, WA (US); Christopher Robert Richard Madonna, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 09/839,784

(22) Filed: Apr. 20, 2001

(65) Prior Publication Data

US 2002/0157091 A1 Oct. 24, 2002

(51) Int. Cl.
G06F 9/44 (2006.01)
G06F 17/30 (2006.01)

(52) U.S. Cl. .......................... 717/173; 705/27
(58) Field of Classification Search ................. 717/178, 717/173; 710/303; 345/744, 746; 705/14, 705/26, 27

See application file for complete search history.

(56) References Cited

U.S. PATENT DOCUMENTS

| 4,405,829 A | 9/1983 | Rivest et al. .............. 178/22.1 |
| 4,827,508 A | 5/1989 | Shear ............................. 380/4 |
| 4,924,378 A | 5/1990 | Hershey et al. ............. 713/201 |
| 4,977,594 A | 12/1990 | Shear ............................. 380/4 |
| 5,050,213 A | 9/1991 | Shear ........................... 380/25 |
| 5,191,573 A | 3/1993 | Hair .............................. 369/84 |
| 5,222,134 A | 6/1993 | Waite et al. .................... 380/4 |
| 5,359,659 A | 10/1994 | Rosenthal ...................... 380/4 |
| 5,410,598 A | 4/1995 | Shear ............................. 380/4 |
| 5,509,070 A | 4/1996 | Schull ........................... 380/4 |
| 5,530,235 A | 6/1996 | Stefik et al. ................. 235/492 |
| 5,606,609 A | 2/1997 | Houser et al. .................. 380/4 |
| 5,625,693 A | 4/1997 | Rohatgi et al. ............... 380/23 |
| 5,629,980 A | 5/1997 | Stefik et al. .................... 380/4 |
| 5,634,012 A | 5/1997 | Stefik et al. ................. 395/239 |
| 5,638,443 A | 6/1997 | Stefik et al. .................... 380/4 |
| 5,654,746 A | 8/1997 | McMullan, Jr. et al. ...... 725/29 |
| 5,666,411 A | 9/1997 | McCarty ....................... 705/51 |
| 5,675,734 A | 10/1997 | Hair ..................... 395/200.01 |

(Continued)

FOREIGN PATENT DOCUMENTS

EP 0 715 245 A1 6/1996

(Continued)

OTHER PUBLICATIONS

"OpeneBook Publications Structure 1.0";Sep. 16, 1999; www.openebook.org/oebpsdownload.htm.

(Continued)

Primary Examiner—Mary J. Steelman
(74) Attorney, Agent, or Firm—Woodcock Washburn LLP

(57) ABSTRACT

This invention describes a system and method for branding software deployed over computer networks. A user contacts the distributor's web site and initiates a download of the software. When the user visits the download website, the identity of the particular web site from which the download was initiated is transmitted to a branding server and captured on the user's computer, preferably in the form of a cookie. Subsequently, the user contacts the branding server and branding instructions are provided to the user's computer in accordance with the cookie. Branding may take the form of featuring the distributor's web site more prominently in an "integrated shopping service" or in a directory, or it may perform other alterations to the software. Branding is controlled by the software manufacturer's branding server, and can be modified at any time after the software is released.

29 Claims, 14 Drawing Sheets

U.S. PATENT DOCUMENTS

| | | | | |
|---|---|---|---|---|
| 5,708,780 | A | | 1/1998 | Levergood et al. .... 395/200.12 |
| 5,715,403 | A | | 2/1998 | Stefik ......................... 395/244 |
| 5,724,425 | A | | 3/1998 | Chang et al. ................. 380/25 |
| 5,734,823 | A | | 3/1998 | Saigh et al. ........... 395/200.06 |
| 5,734,891 | A | | 3/1998 | Saigh ......................... 395/610 |
| 5,742,677 | A | | 4/1998 | Pinder et al. ............... 380/242 |
| 5,765,152 | A | | 6/1998 | Erickson ........................ 707/9 |
| 5,784,609 | A | | 7/1998 | Kurihara ........................ 707/9 |
| 5,809,145 | A | | 9/1998 | Slik et al. ...................... 380/25 |
| 5,832,451 | A | | 11/1998 | Flake et al. ..................... 705/5 |
| 5,835,732 | A | * | 11/1998 | Kikinis et al. .............. 710/303 |
| 5,845,281 | A | | 12/1998 | Benson et al. .................. 707/9 |
| 5,864,620 | A | | 1/1999 | Pettitt ............................. 380/4 |
| 5,883,955 | A | | 3/1999 | Ronning ......................... 380/4 |
| 5,892,900 | A | | 4/1999 | Ginter et al. ................ 395/186 |
| 5,910,987 | A | | 6/1999 | Ginter et al. .................. 380/24 |
| 5,915,019 | A | | 6/1999 | Ginter et al. .................... 380/4 |
| 5,917,912 | A | | 6/1999 | Ginter et al. .................. 380/24 |
| 5,920,861 | A | | 7/1999 | Hall et al. ....................... 707/9 |
| 5,933,498 | A | | 8/1999 | Schneck et al. ................ 380/4 |
| 5,940,504 | A | | 8/1999 | Griswold ........................ 380/4 |
| 5,943,422 | A | | 8/1999 | Van Wie et al. ................ 380/9 |
| 5,949,876 | A | | 9/1999 | Ginter et al. .................... 380/4 |
| 5,958,051 | A | * | 9/1999 | Renaud et al. .............. 713/200 |
| 5,970,475 | A | | 10/1999 | Barnes et al. ................. 705/27 |
| 5,982,891 | A | | 11/1999 | Ginter et al. .................... 380/4 |
| 5,983,245 | A | * | 11/1999 | Newman et al. ............ 715/513 |
| 5,983,273 | A | | 11/1999 | White et al. ................. 709/229 |
| 5,991,399 | A | | 11/1999 | Graunke et al. ................ 380/4 |
| 5,991,402 | A | | 11/1999 | Jia et al. ........................ 705/59 |
| 5,999,622 | A | | 12/1999 | Yasukawa et al. ............. 380/4 |
| 6,006,332 | A | | 12/1999 | Rabne et al. ................ 713/201 |
| 6,018,724 | A | * | 1/2000 | Arent ........................... 705/44 |
| 6,021,492 | A | | 2/2000 | May ............................ 713/200 |
| 6,029,046 | A | | 2/2000 | Khan et al. ................... 725/31 |
| 6,029,141 | A | | 2/2000 | Bezos et al. .................. 705/27 |
| 6,035,403 | A | | 3/2000 | Subbiah et al. ............. 713/201 |
| 6,037,935 | A | * | 3/2000 | Bates et al. .................. 345/760 |
| 6,049,612 | A | | 4/2000 | Fielder et al. ................. 380/44 |
| 6,064,979 | A | | 5/2000 | Perkowski ................... 705/26 |
| 6,067,582 | A | | 5/2000 | Smith et al. .................... 710/5 |
| 6,088,717 | A | | 7/2000 | Reed et al. .................. 709/201 |
| 6,133,916 | A | * | 10/2000 | Bukszar et al. ............. 345/744 |
| 6,195,667 | B1 | | 2/2001 | Duga et al. .................. 715/513 |
| 6,199,053 | B1 | | 3/2001 | Herbert et al. ................ 705/76 |
| 6,226,618 | B1 | | 5/2001 | Downs et al. .................. 705/1 |
| 6,298,446 | B1 | | 10/2001 | Schreiber et al. ........... 713/201 |
| 6,311,269 | B2 | * | 10/2001 | Luckenbaugh et al. ...... 713/154 |
| 6,324,288 | B1 | | 11/2001 | Hoffman ..................... 380/249 |
| 6,331,865 | B1 | | 12/2001 | Sachs et al. ................. 345/776 |
| 6,363,356 | B1 | * | 3/2002 | Horstmann .................. 705/26 |
| 6,385,596 | B1 | | 5/2002 | Wiser et al. .................. 705/51 |
| 6,389,403 | B1 | | 5/2002 | Dorak, Jr. ..................... 705/52 |
| 6,415,270 | B1 | | 7/2002 | Rackson et al. .............. 705/37 |
| 6,425,017 | B1 | | 7/2002 | Dievendorff et al. ....... 709/315 |
| 6,449,645 | B1 | | 9/2002 | Nash ........................... 709/224 |
| 6,606,604 | B1 | | 8/2003 | Dutta .......................... 705/26 |
| 6,629,138 | B1 | | 9/2003 | Lambert et al. ............ 709/224 |
| 6,636,896 | B1 | * | 10/2003 | Philyaw ...................... 709/238 |
| 6,694,320 | B1 | * | 2/2004 | Ortiz et al. .................. 707/101 |
| 6,718,361 | B1 | | 4/2004 | Basani et al. ................ 709/201 |
| 6,753,887 | B2 | * | 6/2004 | Carolan et al. ............. 345/764 |
| 6,763,334 | B1 | | 7/2004 | Matsumoto et al. .......... 705/14 |
| 6,917,923 | B1 | | 7/2005 | Dimenstein ................... 705/51 |
| 2001/0011238 | A1 | | 8/2001 | Eberhard et al. ............. 705/27 |
| 2001/0037302 | A1 | * | 11/2001 | McFadzean et al. .......... 705/51 |
| 2002/0002611 | A1 | | 1/2002 | Vange ......................... 709/223 |
| 2002/0033844 | A1 | * | 3/2002 | Levy et al. .................. 345/744 |
| 2002/0065772 | A1 | * | 5/2002 | Saliba et al. .................. 705/40 |
| 2002/0069265 | A1 | | 6/2002 | Bountour et al. ........... 709/219 |
| 2002/0120507 | A1 | * | 8/2002 | Chanos et al. ................ 705/14 |
| 2002/0138555 | A1 | * | 9/2002 | Yu .............................. 709/203 |
| 2002/0143813 | A1 | * | 10/2002 | Jellum et al. ................ 707/511 |
| 2002/0169805 | A1 | * | 11/2002 | Edge .......................... 707/528 |
| 2003/0167392 | A1 | | 9/2003 | Fransdonk .................. 713/156 |
| 2005/0010475 | A1 | | 1/2005 | Perkowski et al. ........... 705/14 |
| 2005/0251458 | A1 | * | 11/2005 | Perkowski ................... 705/26 |

FOREIGN PATENT DOCUMENTS

| | | |
|---|---|---|
| EP | 0 778 512 A2 | 6/1997 |
| EP | 0 795 809 A2 | 9/1997 |
| EP | 0 798 892 A2 | 10/1997 |
| EP | 0 843 449 A2 | 5/1998 |
| WO | WO 96/24092 | 8/1996 |
| WO | WO 96/42041 | 12/1996 |
| WO | WO 98/44402 | 10/1998 |
| WO | WO 98/45768 | 10/1998 |
| WO | WO 98/58306 | 12/1998 |
| WO | WO 99/01815 | 1/1999 |
| WO | WO 99/26123 | 5/1999 |
| WO | WO 99/45491 | 9/1999 |
| WO | WO 99/55055 | 12/1999 |
| WO | WO 99/63416 | 12/1999 |
| WO | WO 00/21239 | 4/2000 |
| WO | WO 00/75760 A1 | 12/2000 |

OTHER PUBLICATIONS

U.S. Appl. No. 09/604,564, filed Jun. 27, 2000, DeMello et al.

Takahashi, K., et al., "Intelligent Pages: Collecting Shop and Service Information With Software Agents," *Applied Artificial Intelligence*, Sep. 1997, 11(6), 489-499.

Yoon, Seong Soon, et al., "Prototype Development of Directory Interface on Web Browser," *Computer & Software Technol. Lab., ETRI*, Feb. 15-18, 1999, 90-92.

Uehara, S., et al., "Enterprise Model-Based Software Architecture With Server Component Integration," *Fujitsu Laboratories Ltd.*, 1998, 356-363.

Shamir, A. et al., "Playing Hide and Seek with Stored Keys", *Third International Conference*, 1999, Franklin, M. (ed), 118-124.

Auchsmith, D., "Tamper Resistant Software: An Implementation", *First International Workshop*, Anderson, Ross (ed.,) 1996, 317-333.

Jaeger, T., "Flexible Control of Downloaded Executable Content", *ACM Transactions on Information and System Security*, 1999, 2(2), 177-228.

* cited by examiner

Copyright © Microsoft Corporation

SERVER CONTROLLED BRANDING OF CLIENT SOFTWARE DEPLOYED OVER COMPUTER NETWORKS

COPYRIGHT INFORMATION

A portion of the disclosure of this patent document contains material that is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates generally to the field of computing. More particularly, the invention relates to a system and method for providing an integrated shopping service within an application program. One specific application of such an integrated shopping service is a service that allows users of a content-rendering application to shop for digital content at a dynamically-updatable set of retail web sites.

BACKGROUND OF THE INVENTION

Certain software requires third parties to provide digital content in order to make the software valuable to users. A prime example is an application for rendering books, audio, video, etc. Such an application is useful only when digital content—e.g., text, audio, video, etc.—is available for use with the application or device, and such digital content is generally provided by third parties.

Typically, a user obtains the content by using a stand-alone web browser (e.g. Internet Explorer or Netscape Navigator) to find and obtain content from Internet web sites that provide it. Sites that distribute content may be located with the aid of a search engine. This method, however, does not offer the user the convenience of shopping for content from within the rendering application.

As an alternative to the stand-alone browser, a browser may be integrated into the content-rendering application, and the application may be hard-coded to point the browser to one or more web sites that provide content. This approach, however, has drawbacks; if the universal record locators (URLs) of particular web sites are hard-coded into the browser, it is difficult to add or delete web sites to or from the list, or to customize the list for different instances of the application.

Branding is a term used for practices a merchant employs to distinguish his goods from similar goods or services sold by other merchants. Branding can be implemented through trademarks (i.e., a particular name or image identified with the source of the product), or trade dress (i.e., the overall look, feel or packaging that identifies a particular merchant).

Heretofore, it has been difficult for merchants to brand software because typically a software manufacturer distributes a given piece of software to a number of merchants, who sell that same piece of software. When software is sold on the Internet, the merchant may expose the consumer to branding information (e.g., the merchant's name on the web site), but only for a short time while the consumer completes the purchase or initiates a download. It may be desirable to "brand" the software by including a lasting mark in the software that indicates where the user purchased the software, or that otherwise causes the software to behave in a certain way based on the place where it was purchased.

The need for branding is particularly acute in the field of software that is given away for free in order to stimulate a market for another product, as in the case of a digital content retailer who gives away rendering software in the hope that users will purchase content compatible with the software. Such a retailer might like to brand the software in such a way that the user will be encouraged to return to the retailer's site to purchase content.

Conventionally, branding of software is achieved by creating different versions of the same software for each merchant who sells or distributes the software. This approach results in higher costs for a software producer because of time spent creating different versions of the software, testing it before release, and managing it thereafter. Furthermore, after the software is released, branding information is generally not changeable. Additionally, since each brand of the same software effectively represents a different version of the software, it is difficult to deploy a global upgrade of the software (i.e., replacement of every user's copy with an upgraded copy) without losing the branding information.

In view of the foregoing, there is a need for a software branding system that overcomes the limitations and drawbacks of the prior art.

SUMMARY OF THE INVENTION

The present invention provides an infrastructure for a shopping service within a user application, such as a content-rendering application. An application in accordance with the invention includes a link to a retail directory server (e.g., the application may store the universal record locator or "URL" of such a server). Upon being contacted by the application, the retail directory server renders on the user's machine a web page containing a list of retail web sites. The web page rendered by the retail directory server offers the user the chance to add some or all of the listed sites to a private list of retailers that is stored on the client machine. The particular set of retail sites listed in the directory server can be modified at any time by the party who controls the directory server. An application in accordance with the invention also includes a retail shopping user interface, which displays to the user all retailers in his or her private list and allows the user to connect to any of the retailers on that list. A retail shopping service is thus "integrated" into the application.

In one embodiment of the invention, the application that incorporates an integrated shopping service is a content-rendering application, such as an eBooks reading application. In such an application, the integrated shopping service may take the form of an "integrated bookstore," which displays a list of on-line bookstores that sell eBooks and allows the user to navigate to those bookstores directly through the list. The retail directory server whose URL is included in the application may provide a "bookstore directory," which renders a list of on-line bookstores on the user's machine and offers the user the opportunity to add those bookstores to his or her private list. The actual list of bookstores displayed to the user as part of the application's "integrated bookstore" is the private list of bookstores chosen by the user from the bookstore directory page.

In another embodiment, the retail directory server may be configured to provide arbitrary data to the user's machine, rather than merely a list of retail web sites. For example, the directory server may download to the user's machine a set of off-line catalogues that the user can use to shop for content when not connected to the Internet. For example, if the user's machine is a palm-size computer, the user may be able to shop off-line for content, where off-line orders are stored for transmission to an appropriate web site when the device is cradled. The user's machine may store parameters (e.g., in the form of cookies) that allow customized content to be delivered to the user from the retail directory server. For example, the user may subscribe to an on-line newsletter (e.g., through a previous contact with the retail directory), and this newsletter may then be updated on the user's machine each time the bookstore directory server is contacted. In contrast to systems that merely hardcode a list of retail web sites into an application, the use of a bookstore directory server, whose information can be updated or modified at any time, supports extensibility of the directory function.

The present invention further provides a technique for branding. The particular brand that is associated with the software depends on branding criteria, e.g. the location from which the software was downloaded.

When downloading the software from the Internet, the branding criteria are captured on the client. For example, the site from which the software is downloaded may cause an indication of the download source to be deposited onto the client. Subsequently, the client may contact a branding server and transfer the captured information to the server. The server then provides branding instructions to the client software. These instructions may take the form of executable code and/or identifying indicators such as logos. The branding instructions and indicators can be updated in the future by re-contacting the branding server, thereby allowing brands to be changed or added.

As one non-limiting example, the software to be branded is a content-rendering program that is distributed for free from a web site, where a retailer or distributor sells content for use with that program from the web site. In this example, the retail site may, upon download of the software to a client machine, and initiate contact with a branding server that causes a cookie to be deposited onto the client, where the cookie specifies the identity of the distributor. At some point in the future, a triggering event on the client (e.g., on-line registration or "activation" of the program for use with high-security content) causes the cookie to be transmitted back to the branding server. In response to this contact, the branding server provides branding information to the client consistent with the information described in the cookie. This branding information may, for example, cause a link to the universal record locator (URL) of the retailer to be displayed (or, perhaps, more prominently displayed) in a "content-shopping" feature of the content-rendering software, thereby encouraging the user to shop for content at the retailer's site.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The Internet has provided consumers with opportunities to shop for numerous and varied products on line. Using a browser, a consumer can visit a seemingly limitless number of web sites and purchase nearly any type of good or service. Some types of goods, and services, however, are particularly adapted to be used with certain software applications. A case in point is digital content (e.g., books, audio, video, etc.) that comes delivered in a particular format for use with a certain type of rendering application (e.g., an electronic book reader, an audio player, a video player, etc.). It is particularly useful for a consumer to be able to purchase such content from within the rendering application itself. It is further useful to limit the universe of web sites that a consumer can access from within the rendering application to those web sites that distribute digital content adapted for the application. The present invention provides an architecture for a shopping service that allows a user to visit certain web sites (e.g., retail web sites) from within an application, and that allows a third party entity to control which web sites can be accessed from within the application.

The present invention further provides a technique for branding a software application, such as the rendering application that incorporates a shopping service discussed above. The particular brand that is associated with the software depends on branding criteria, such as the location from which the software was downloaded.

Exemplary Computing Environment

Figure 1:
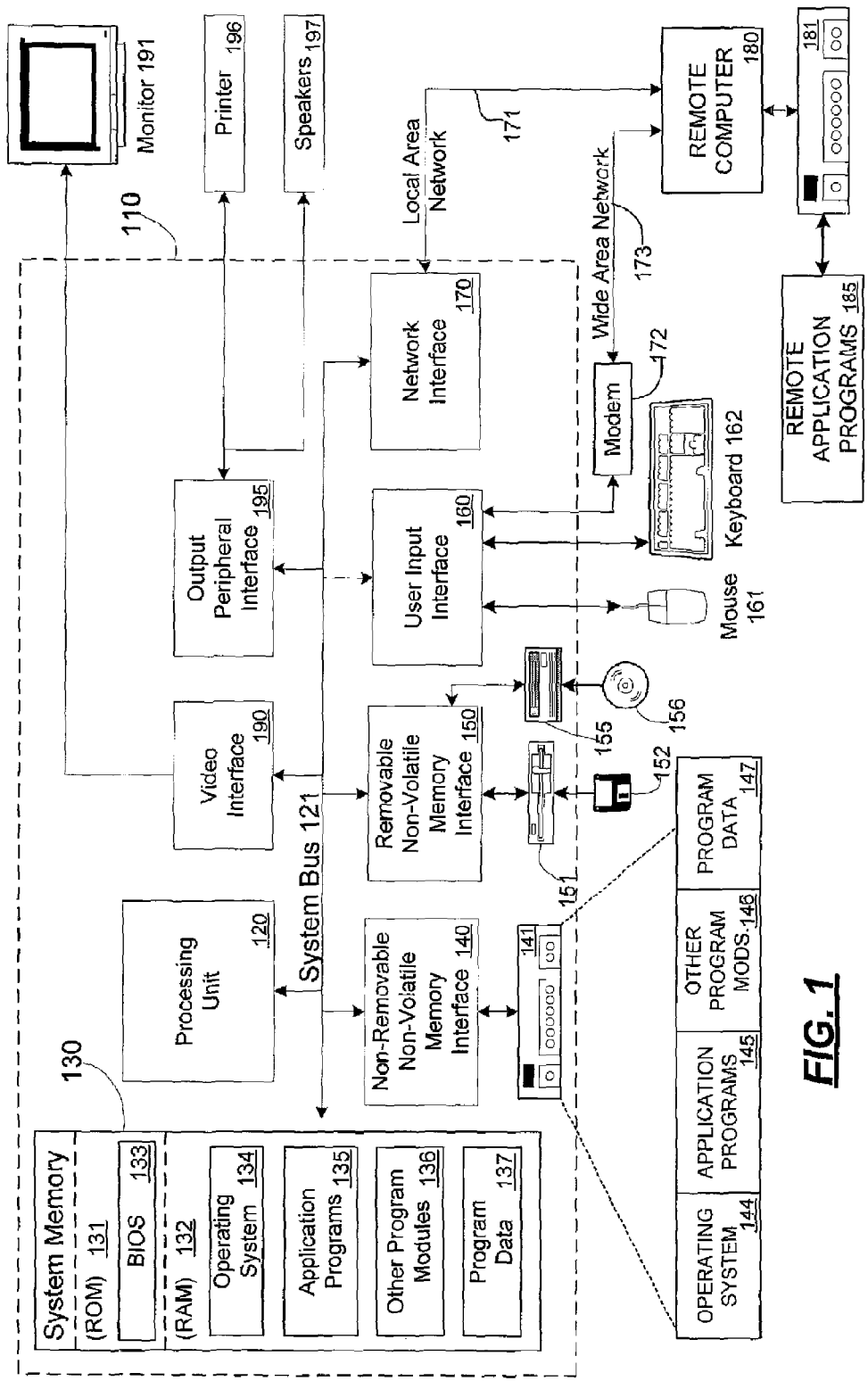
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Application with Integrated Shopping Feature

Figure 2:
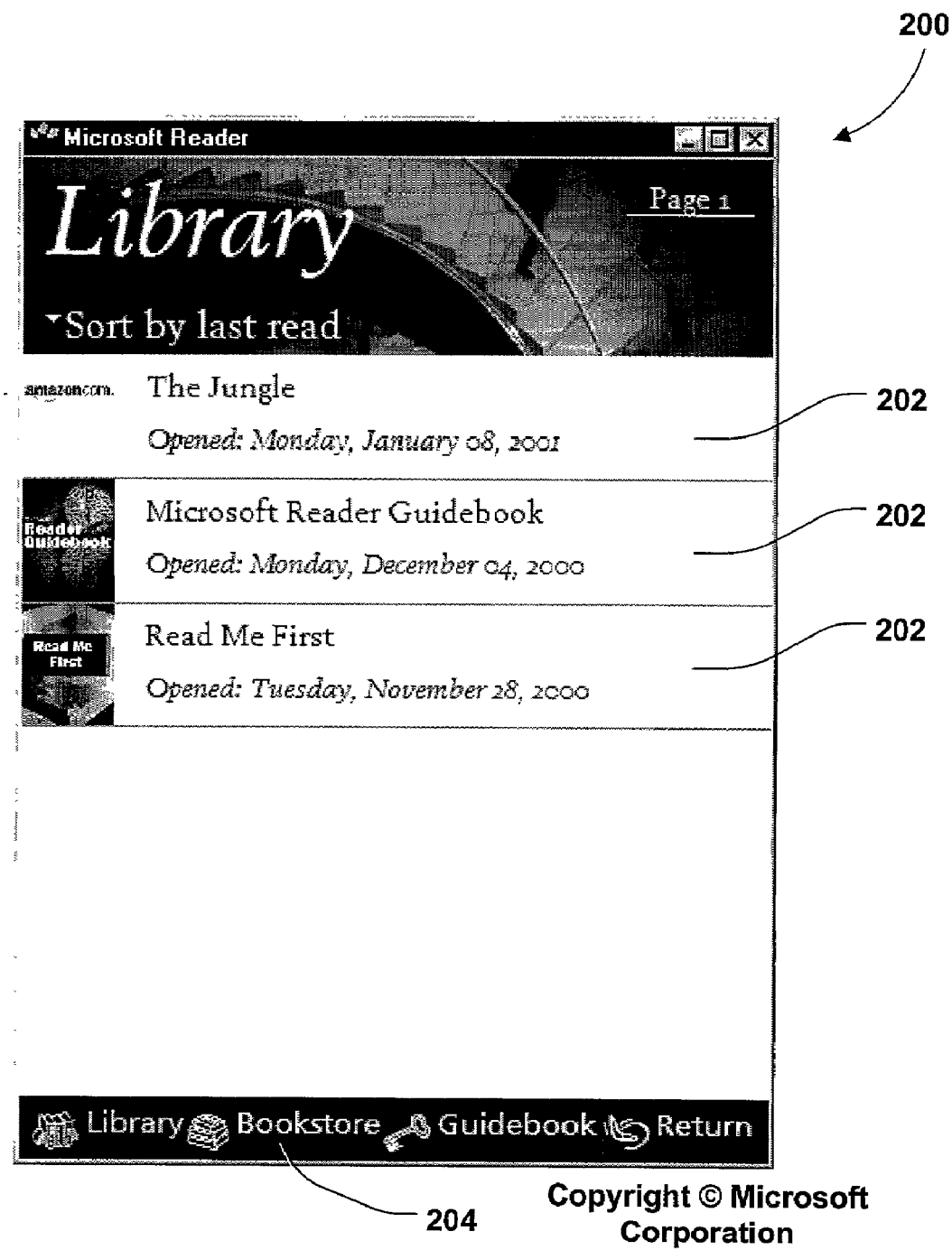
FIG. 2 is a diagram of a user interface for an exemplary software application in accordance with aspects of the invention.

Referring now to FIG. 2, there is shown a user interface of an application 200. In FIG. 2, application 200 is depicted as a text-rendering application for reading electronic books ("eBooks") 202. It will be appreciated, however, that a text-rendering application is merely exemplary, and application 200 may be any type of application. For example, application 200 may be a rendering application that renders other types of content (e.g., music, video, multimedia, etc.). As described below, it is particularly useful to incorporate an integrated shopping feature into a content-rendering application, because the integrated shopping feature may be used to shop for digital content that is adapted to be rendered by the rendering application. However, application 200 need not be such a rendering application. In greater generality, application 200 may be any application in which it is useful or desirable to incorporate an integrated shopping feature as described below. All such embodiments of application 200 are within the spirit and scope of the invention.

As noted above, in the example of FIG. 2 application 200 renders eBooks 202. eBooks are known in the art and are described generally in "Open eBook Publication Structure 1.0" (Sep. 16, 1999), available at http://www.openebook.org/oebpsdownload.htm, which is incorporated herein by reference. Typically (although not necessarily), eBooks are obtained separately from the application used to render them—i.e., the user uses a stand-alone browser to navigate to a web site that distributes eBooks, chooses an eBook, and then downloads a file containing the eBooks to the user's computing device, at which point the user may use application 200 to "click" on one of eBooks 202 (e.g., by using pointing device 161, shown in FIG. 1) in order to open and render the eBook. At least some of eBooks 202 may have been obtained by a user's navigating to a web site and obtaining the book (either directly or indirectly) from that web site. However, since text-rendering application 200 is of limited value without a source of eBooks, it is particularly useful to incorporate into application 200 a shopping feature that permits a user to shop for eBooks from within application 200. The present invention provides such a feature.

Figure 3:
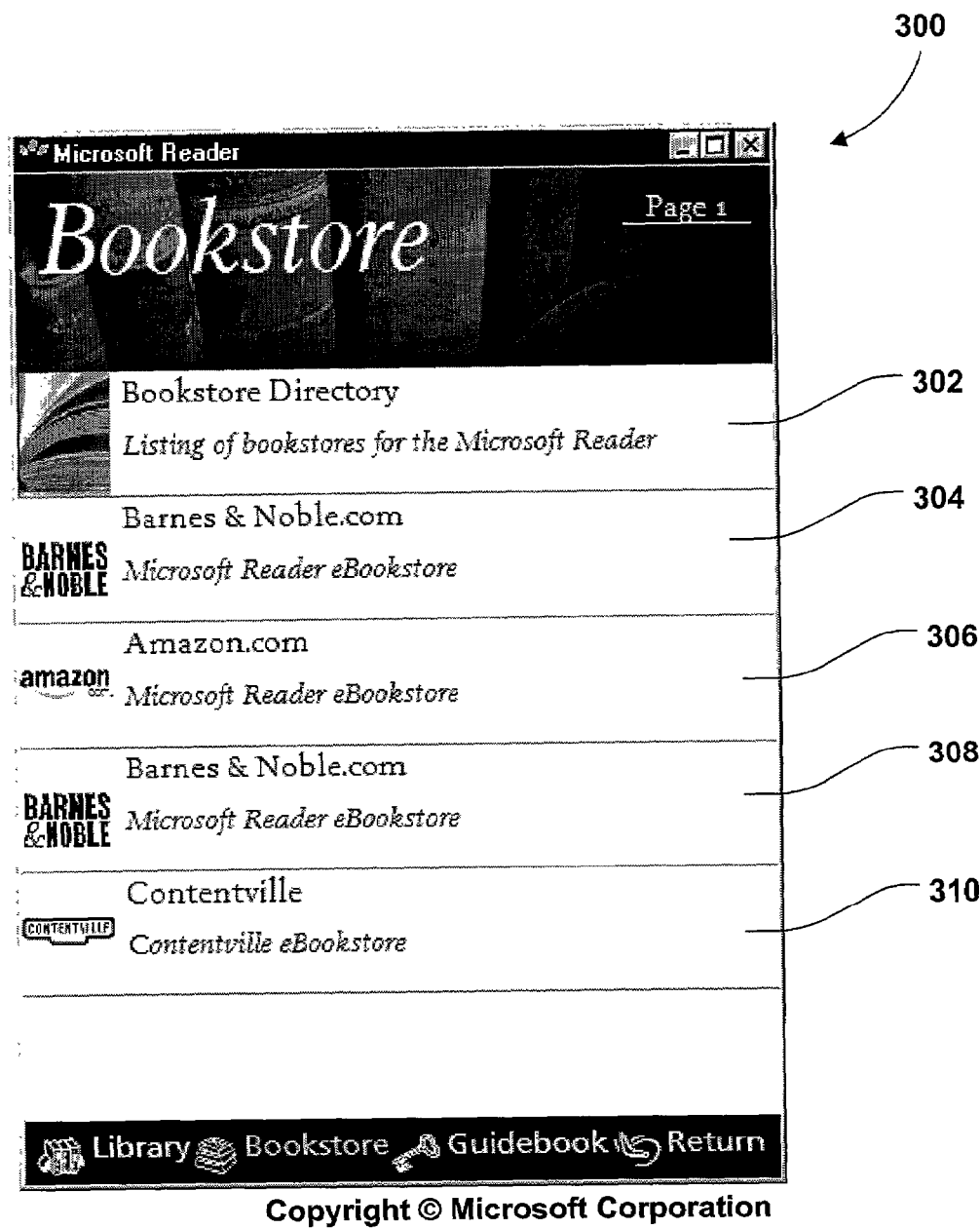
FIG. 3 is a diagram of a user interface for an exemplary shopping service which, in accordance with aspects of the invention, is integrated into a software application.

FIG. 3 shows a user interface for an exemplary shopping service 300 in accordance with the invention. Preferably, shopping service 300 provides an interface whereby a user may visit web sites from within application 200. For example, the exemplary interface shown in FIG. 3 includes a list of links 302–310; clicking one of the links (e.g., by using pointing device 161, shown in FIG. 1) allows the user to visit the web site indicated by the link. At least some of the links are links to web sites that perform retail functions, such as the selling of digital content. FIG. 3 shows an example where shopping service 300 is adapted to an eBook-reading application, and thus links 304, 306, 308, and 310 are links to sites that distribute eBooks. For example, a user of the application depicted in FIG. 2 might click on the "bookstore" icon 204 in order to shop for eBooks, thereby invoking the shopping service depicted in FIG. 3. It will be appreciated that, when shopping service 300 is associated with an application other than an eBooks-reading application, the links provided in shopping service may be links to web sites that distribute different types of products. For example, if shopping service 300 were associated with an audio- or video-rendering application, then shopping server 300 would preferably display links to web sites that distribute digital audio or video.

In a preferred embodiment, shopping service 300 comprises a form of web browser. For example, the web browser may be a standard web browser with a simplified user interface (that may include fewer user functions than the standard user interface when the browser is opened as a stand-alone). When shopping service 300 comprises a form of web browser, the logic that implements shopping service 300 is capable of displaying and following links to any web site, regardless of whether the web site is a retail web site, and regardless of whether the web site sells products that are related to the application 200 of which shopping service 300 is a part. The particular choice of links displayed (i.e., the fact that at least some of the links are to retail web sites) allows the web browser to function as a shopping service. It will be noted, however, that in the example of FIG. 3, one of the links (i.e., link 302) is not a link to a retail web site, but rather a link to a "bookstore directory," which is described below. The web-browsing logic that shopping service 300 uses to visit web sites is preferably content-agnostic to the type of information contained at the web site; as long as a link is properly listed in shopping service 300, the web browser will follow the link regardless of what type of information is maintained at the site.

Figure 4:
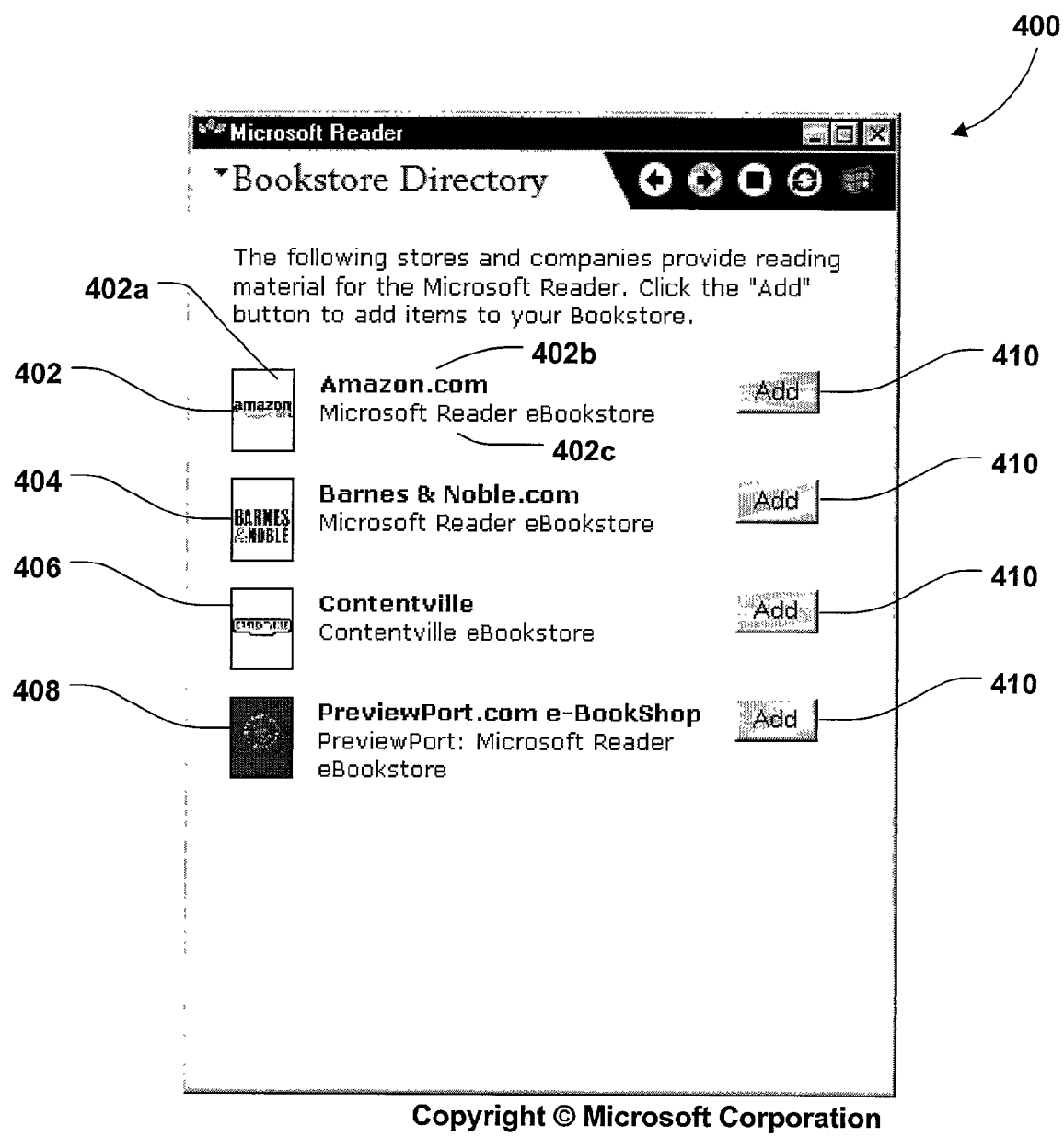
FIG. 4 is a diagram of a retail directory, as displayed on typical web browsing software.

FIG. 4 shows a retail directory 400, as might be displayed on web browsing software. In FIG. 4, retail directory 400 is shown as a "bookstore directory"—i.e., a directory of electronic "bookstores" that sell eBooks—although it will be understood that a directory of eBooks vendors is merely exemplary, and retail directory 400 may comprise a list of any type of web site without departing from the spirit and scope of the invention. "Web browsing software," in this context, includes general purpose web browsers such as MICROSOFT INTERNET EXPLORER. Preferably, the "web browsing software" is the web browsing functionality associated with shopping service 300, as described above in connection with FIG. 3. As explained below, this web browsing functionality may include special purpose web browsing logic within the application 200 of which integrated shopping service 300 is a part. (As further discussed below, the web browsing functionality that implements a shopping service within an application may, in fact, be provided by a general purpose web browsing program such as INTERNET EXPLORER.) In a preferred embodiment, a user accesses retail directory 400 by clicking a link such as link 302 (shown in FIG. 3) within a shopping service 300.

Retail directory 400 preferably comprises a web page that lists one or more retail web sites. The exemplary retail directory 400 in FIG. 4 lists retail web sites 402, 404, 406, and 408. Each listing includes various components. For example, listing 402 includes a logo 402a, a web site name 402b, and a web site description 402c. Associated with each listing is an "add" button 410. By clicking on the "add" button 410 associated with a particular web site listing, the user adds the web site to his or her personal list of retail web sites. (The process of using the retail directory 400 to add web sites to a personal list is described below in connection with FIG. 8.) Thus, retail directory 400 contains a list of web sites that a user can choose to add to the list displayed by integrated shopping feature 300, and integrated shopping service 300 will display those web sites that the user has selected from retail directory 400. (It should be noted that, in some cases, the integrated shopping feature may be configured to display certain web sites without the user's having selected those sites from retail directory 400.)

Structure of an Application Having an Integrated Shopping Service

Figure 5:
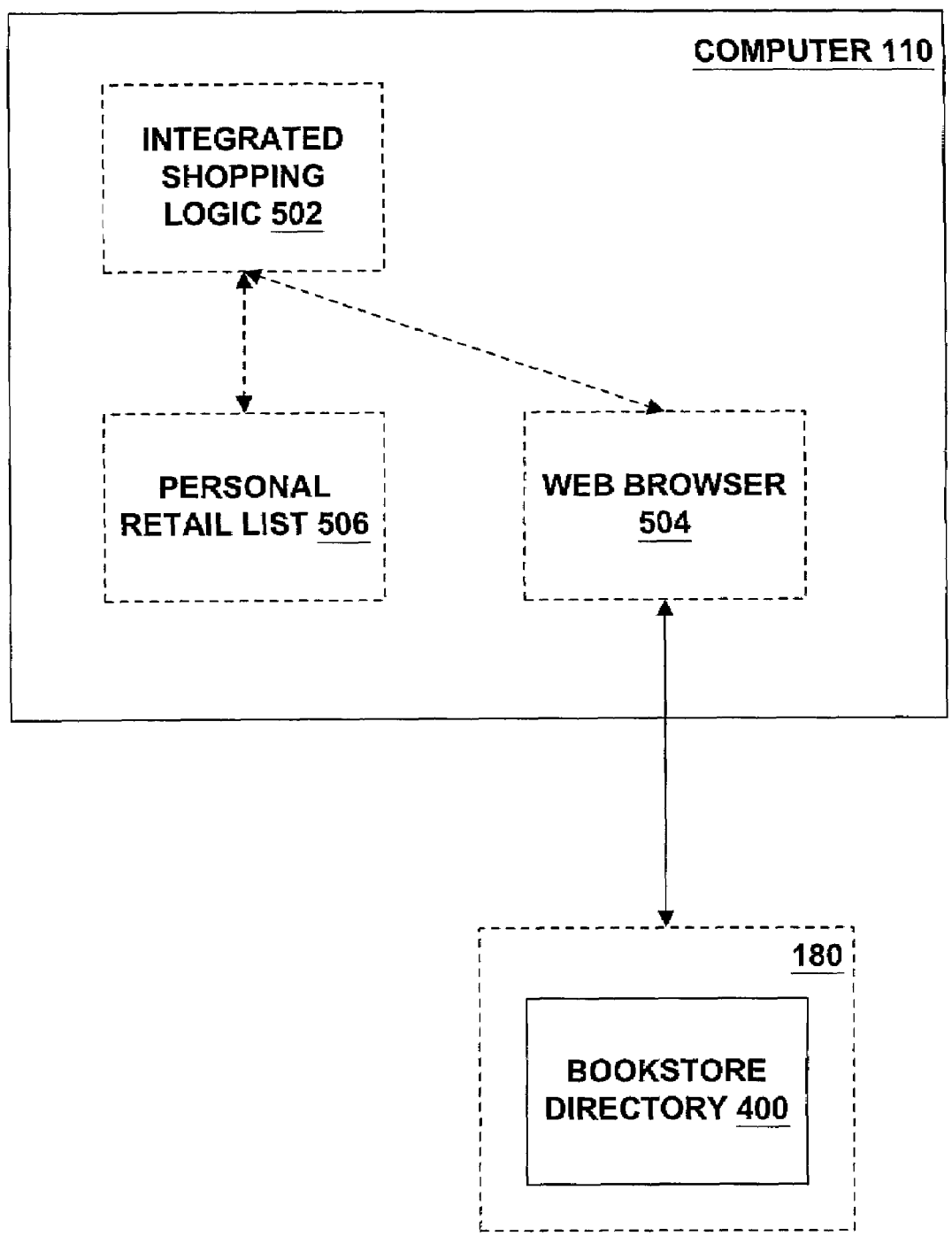
FIG. 5 is a block diagram of a software application having an integrated shopping service according to aspects of the invention.

Referring now to FIG. 5, there is shown an exemplary structure of an application 200 that employs an integrated shopping service 300. Application 200 (which runs on computer 110, shown in FIG. 1), includes integrated shopping logic 502. Integrated shopping logic 502 comprises software which performs functions including: (a) providing the user interface (UI) and functionality that enables a user to visit retail web sites; and (b) maintaining a list of retail web sites that a user may visit as part of integrated shopping service 300.

Integrated shopping logic 502 may employ or provide web browser 504, in order to provide the UI and functionality that permits the visiting of retail web sites. For example, integrated shopping logic 502 may include instructions that starts web browser 504 whenever the user invokes integrated shopping service 300. Web browser 504 may be a web browsing module that is specially adapted to work with application 200. Alternatively, web browser 504 may be a general-purpose web browser such as the INTERNET EXPLORER browser, which can be invoked from within application 200. When web browser 504 is embodied as a general-purpose web browser, application 200 may invoke web browser 504 in such a way that it appears to a user as if it were included within application 200—e.g., integrated shopping logic 502 may invoke web browser 504 inside the window of application 200.

Integrated shopping logic 502 may also employ or provide a personal retail list 506. Personal retail list 506 includes the list of links that are to be displayed by web browser 504. For example, referring back to FIG. 3, in exemplary integrated shopping service 300 links 302–310 may be stored in personal retail list 506. Thus, in a preferred embodiment, application 200 implements an integrated shopping service by invoking web browser 504 and instructing it to display the links found in personal retail list 506.

Integrated shopping logic 502 may include the capability to add (or delete) items from personal retail list 506. In the example of FIG. 5, integrated shopping logic 502 uses web browser 504 to access retail directory 400, and adds new retail sites from retail directory 400 to personal retail list 506. For example, retail directory 400 may be implemented on a remote computer (e.g., remote computer 180, shown in FIG. 1), which functions as a "retail directory server." Retail directory 400 may take the form of an HTML file which is stored on remote computer 180, and which is dynamically updatable to reflect a current list of retail site choices. Thus, the HTML file and the remote computer 180 on which it is stored may be represented together as a universal record locator (URL). A user may access retail directory 400 by clicking on a link (e.g., link 302 shown in FIG. 3), which navigates to the URL of the retail directory 400. When a user accesses retail directory 400, web browser 504 displays the retail directory HTML file as a web page (e.g., the web page shown in FIG. 4). When the user clicks an "add" button 410 for a particular retail web site listed in retail directory 400, logic stored in the web pages executes, thereby causing data representative of the selected retail web site to be downloaded from remote computer 180 to the user's computer 110. Integrated shopping logic 502 then stores the downloaded data in personal retail list 506.

It should be observed that web browser 504 and personal retail list 506 are shown in FIG. 5 as being within application 200. However, this arrangement is merely exemplary, as web browser 504 and personal retail list 506 merely need to be accessible to integrated shopping logic 502, and do not necessarily need to be contained within application 200. For example, web browser 504 may be a dynamic-link library (.dll file) provided as part of the operating system that resides outside of the file(s) that store application 200. Alternatively—and particularly when web browser 504 is a general-purpose web browser—web browser 504 may be a set of files that is separate from the file(s) that store application 200 (e.g., web browser 504 may be the .exe file, and related data files, that store the INTERNET EXPLORER browser). Likewise, personal shopping list 506 could be stored within application 200, but could also be stored as one or more files separate from application 200. In a preferred embodiment, personal retail list 506 is stored under a set of registry keys in the WINDOWS registry of the device on which application 200 is installed. (Certain parts of the retail list may be stored outside of the registry; for example, a bitmap for a logo, being several kilobytes in size, may be stored in a separate file.)

Exemplary Structure of a Retail Directory

Figure 6:
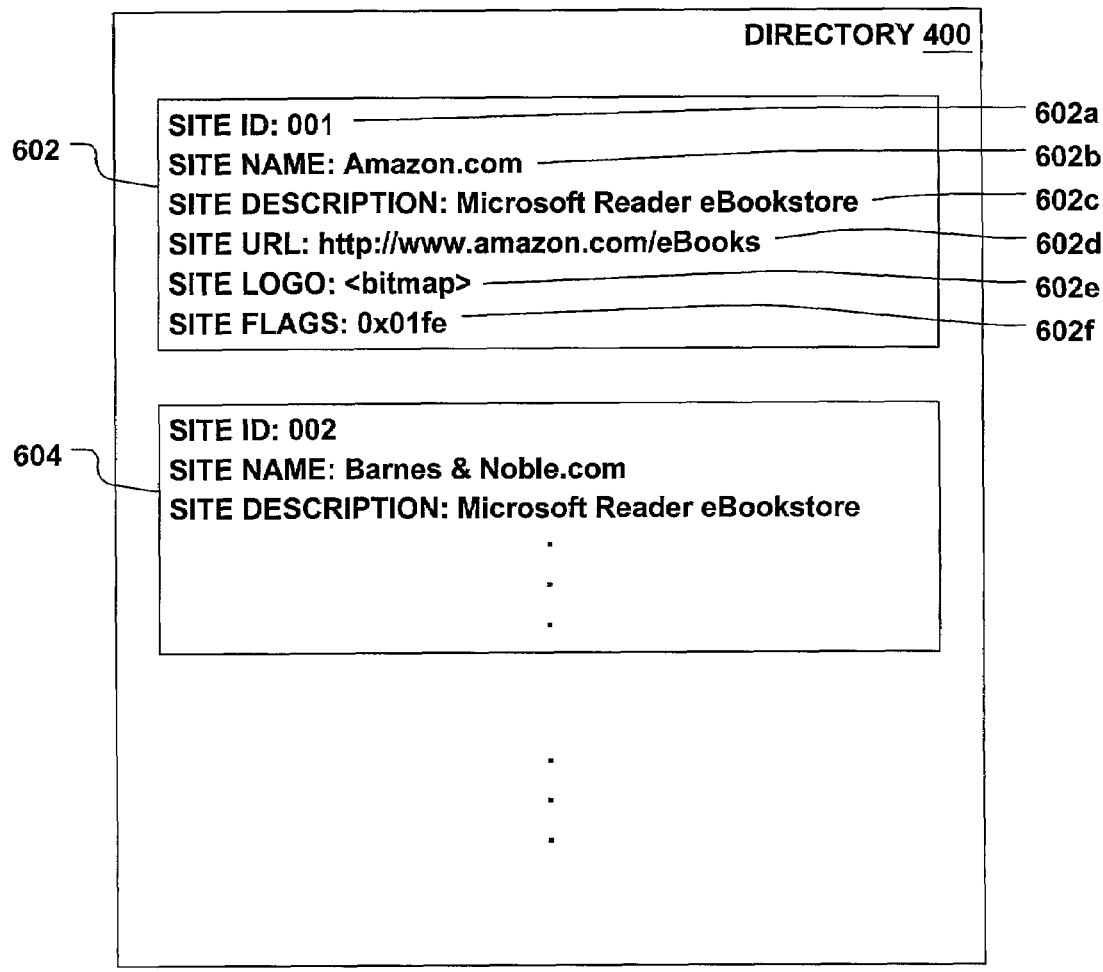
FIG. 6 is a block diagram of an exemplary data structure for a retail directory.

FIG. 6 shows an exemplary structure of retail directory 400. As noted above, retail directory 400 comprises a list of retail sites that may be added to a user's personal retail list. As also noted above, each retail site is represented by certain data. FIG. 6 thus shows an exemplary data structure for retail directory 400, including the various data fields that are used to represent each retail site.

Retail directory 406 lists various retail sites. Each retail site has an entry 602, 604. FIG. 6 shows only two entries, but it will be understood that the number of entries shown is merely exemplary, as retail directory 400 may have any number of entries; the actual number depends on the number of retail sites that are available to be used with an integrated shopping service 300. In the example of FIG. 6, entry 602 and 604 correspond to retail web sites 402 and 404, respectively (shown in FIG. 4).

Each entry in retail directory 400 is represented by various data fields. In the example of FIG. 6, entry 602 includes a site ID 602*a*, a site name 602*b*, a site description 602*c*, a site URL 602*d*, a site logo 602*e*, and site flags 602*f*. Other entries include like data fields. The site ID 602*a* is a number that is assigned uniquely to each site that appears in the retail directory. The number may, in one example, be used by the integrated shopping service 300 to sort the entries when they are displayed to the user. In this case, the particular site ID 602*a* assigned may be based on a business relationship with the owner/operator of the web site—that is, the distributor of application 200, and the owner/operator of the web site, may agree that web site will appear in a specified order on the list displayed by integrated shopping service 300, in which case the site ID 602*a* may be used to fulfill that agreement when the sites are sorted by their respective side IDs. The site name 602*b* is the commonly used name for a particular web site. For example, the web site whose URL is http://www.amazon.com is commonly known as "amazon.com," and thus the site name field 602*b* contains "amazon.com." The site description 602*c* is a text string that preferably describes the site. In the example, the site description of "amazon.com" is "Microsoft Reader eBookstore." The site URL 602*d* is the actual URL at which the site is located, and it may not be shown as part of the user interface. Site logo 602*e* is a graphical image (e.g., a bitmap) that is associated with the retail site represented by entry 602. Typically, the graphical image is the logo associated with a retail site, although any image may be stored in field 602*e*. Site flags 602*f* include technical information about the retail site, for example, the file format of site logo 602*e*. It should be understood that data fields 602*a*–602*f* are merely exemplary, and a web site could be represented by any appropriate data without departing from the spirit and scope of the invention.

The web page that a user's computer 110 downloads when viewing retail directory 400 includes: (a) the information in each entry 602, 604 (or at least a subset of that information), in a format suitable for rendering by a web browser; and (b) executable instructions that cause the information in each entry to be downloaded to the user's computer 110 when the user clicks an "add" button 410 (shown in FIG. 4). It should be noted that the data that is added to a user's personal retail list 506 when an "add" button 410 is clicked may in fact be an exact copy of the data in the selected entry 602, 604.

It should be noted that retail directory 400 may be stored by any means and in any manner that supports the storage of data. As one non-limiting example, all entries 602, 604 may be stored in a file. As a further example, the file that stores entries 602 and 604 may, in fact, be an HTML file that is downloaded to a user's machine for viewing as the retail directory web page. In this case, the retail directory page shown in FIG. 4 is merely the rendering of the HTML page. When retail directory 400 is represented as such an HTML page, some data may be stored in nonprinting fields. (E.g., the site ID 602*a*, site URL 602*d*, and site flags 602*f* may be stored in non-printing fields or as part of the scripting code executed by the web page, since those items are not displayed when the retail directory page is rendered on a browser as shown in FIG. 4.)

Exemplary Structure of a Personal Retail List

Figure 7:
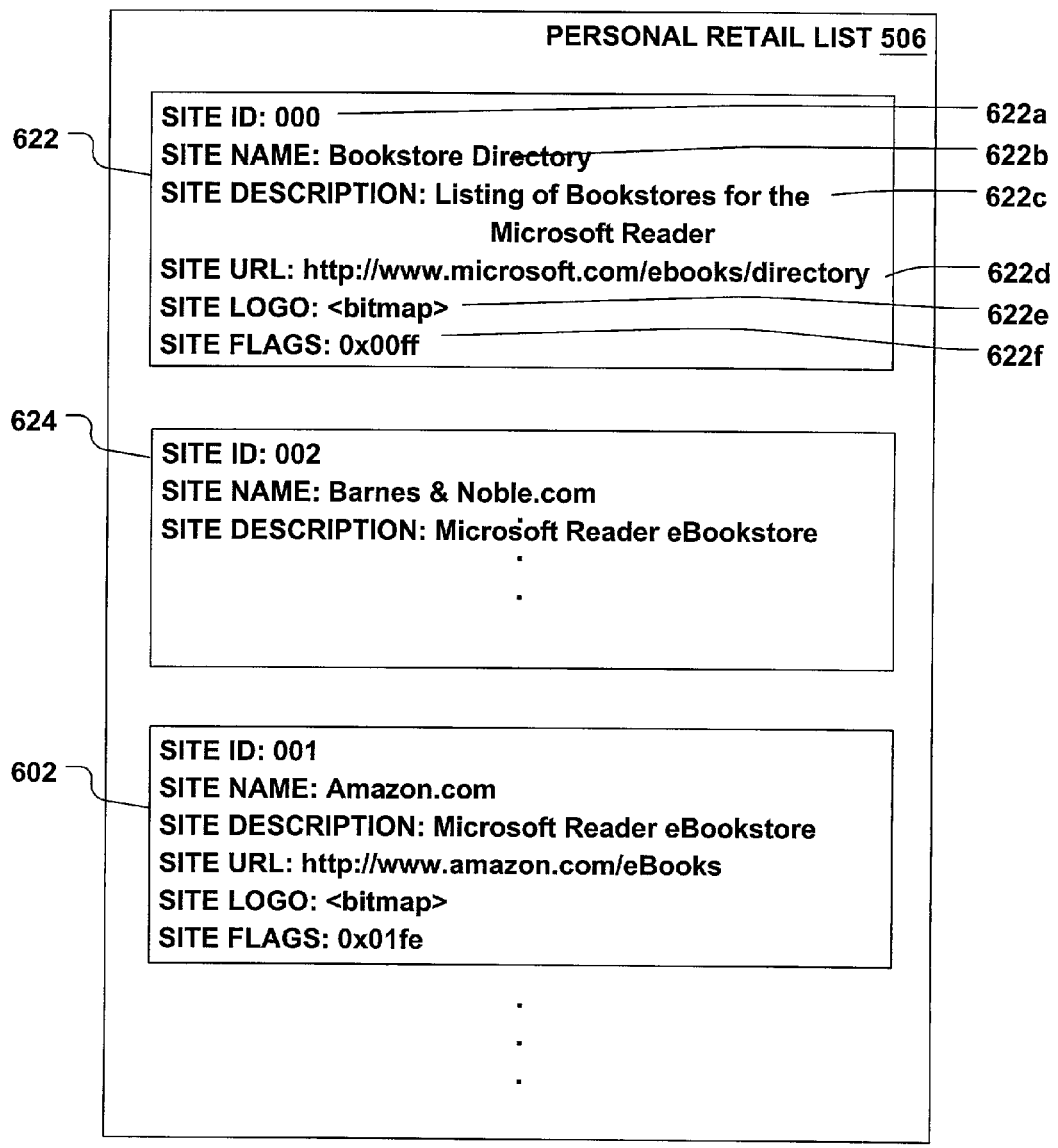
FIG. 7 is a block diagram of an exemplary data structure for a personal retail list.

FIG. 7 shows an exemplary structure of a personal retail list 506, which is stored on the computing device that runs the application 200 with which integrated shopping service 300 is associated. Personal retail list 506 includes a plurality of entries 602, 622, 624, which correspond to the various web sites that a user can access from within integrated shopping service 300. In order for a web site to be accessible from within integrated shopping service 300, an entry corresponding to that web site is included in personal retail list 506.

Entry 622 includes data fields for a site ID 622*a*, site name 622*b*, site description 622*c*, site URL 622*d*, site logo 622*e*, and site flags 622*f*. Entries 624 and 602 include like fields. As can be seen from a comparison between FIGS. 6 and 7, the format of the entries in persona retail list 506 correspond to the format of the entries in retail directory 400. It will be noted that, in the example of FIGS. 6 and 7, entry 602 appears in both personal retail list 506 and in retail directory 400. Preferably, entries in retail directory 400 and personal retail list 506 are in the same format. More preferably, entries are inserted into personal retail list 506 by copying them from retail directory 400, which occurs when a user selects a web site in retail directory 400 to be included in his or her personal retail list 506 by clicking "add" button 410. The process of migrating information from retail directory 400 to personal retail list 506 is described below in connection with FIG. 8.

It will further be observed that the first listed entry 622 in FIG. 7 is an entry for the retail directory 400 itself. This example underscores two points: First, any web site may be listed in personal retail list 506, regardless of whether it is a retail web site or some other type of web site; integrated shopping service 300 is most useful when personal retail list 506 includes at least some retail web sites, but the architecture of integrated shopping service 300 permits any type of web site to be represented in personal retail list 506 (and rendered by web browser 504). Second, as discussed above, retail directory 400 is implemented as an ordinary web site, and thus can be visited like any other web site. Moreover, by implementing retail directory 400 as an ordinary web site, retail directory 400 can be designed with the breadth of functionality available to web sites in general (i.e., retail directory 400 may have all the features supported by HTML, and most importantly, it can be updated at any time, even after the application has been installed by the user). This aspect of the invention supports the extensibility of application-integrated retail directories, which is a significant advance.

It will be appreciated that the data structure shown in FIG. 7 is merely exemplary, and personal retail list 506 may store any type of information (in any format), so long as the information and the format in which it is stored identifies those web sites that may be visited from within integrated shopping service 300. Moreover, personal retail list 506 may be stored in any manner (e.g., in a file, under a set of registry keys, inside a database, etc.) without departing from the spirit and scope of the invention. Preferably, personal retail list is at least partly stored under a set of registry keys that can only be modified by the server that provides retail directory 400; this type of storage gives the entity that provides retail directory 400 control over the content of personal retail list 506 by deterring user modification.

Process of Using Retail Directory 400 to Select Retail Web Sites

Figure 8:
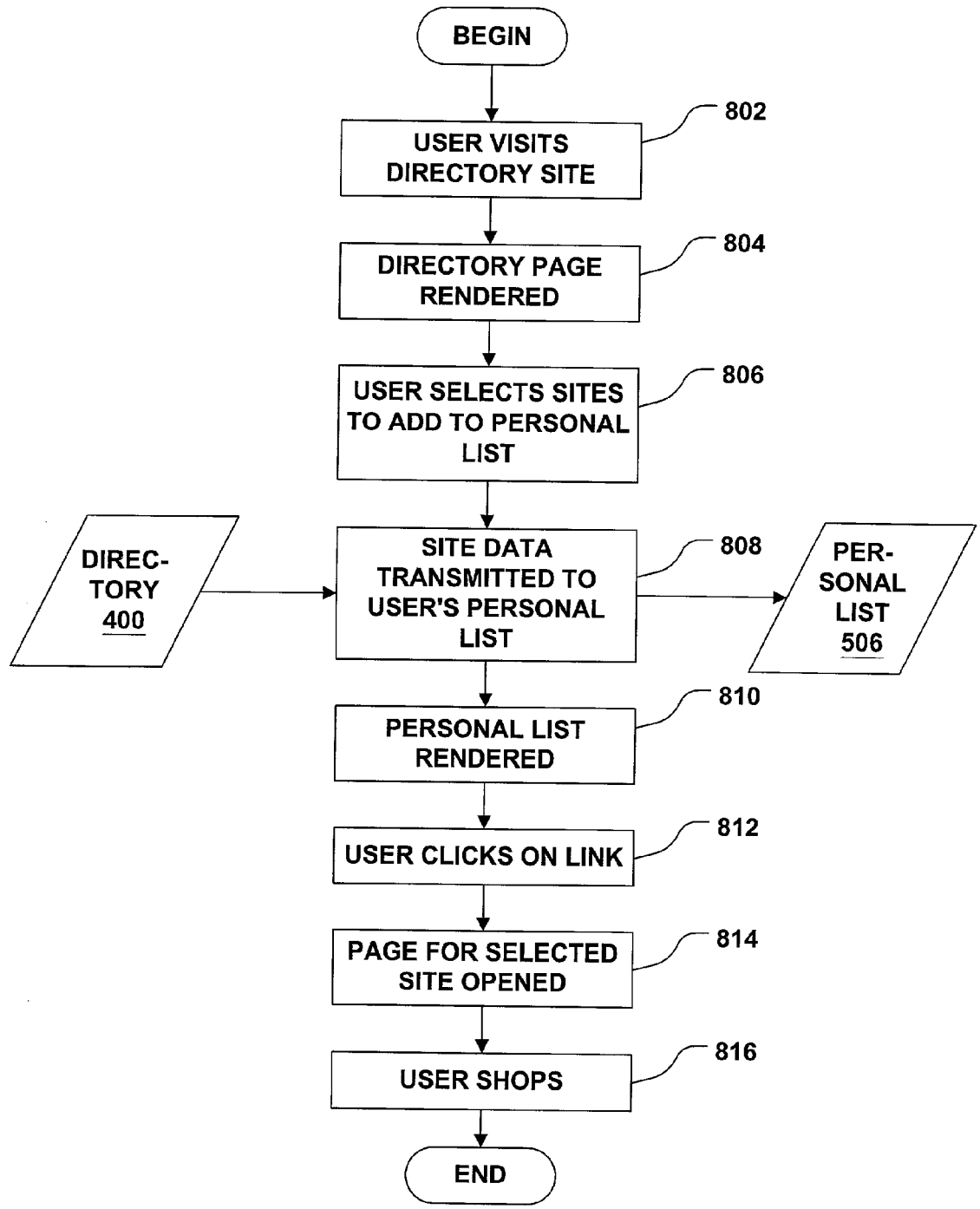
FIG. 8 is a flow diagram of an exemplary process for using a retail directory to add retail web sites to a personal list, in accordance with aspects of the invention.

FIG. 8 shows an exemplary process by which a user accesses retail directory 400 and adds web sites to his or her personal retail list 506. At step 802, the user visits retail directory 400. This action may be performed by a user opening an ordinary stand-alone browser (e.g., the MICROSOFT INTERNET EXPLORER browser), and visiting the retail directory web site by entering a URL. Preferably, the URL of the retail directory 400 web site is included in personal shopping list 506 (or is otherwise incorporated into application 200 that includes integrated shopping service 300), so that the user may visit the retail directory web site using integrated shopping service 300. In one example, application 200 is delivered to the user with a personal shopping list 506 that includes an entry for retail directory 400, so that the user will initially be able to access retail directory 400 from integrated shopping service 300.

At step 804, the retail directory page is rendered on the user's device. The rendering is performed either by a stand-alone browser (if the user uses a stand-alone browser to visit the web page), or by the web browser 504 (shown in FIG. 5), if integrated shopping service 300 has been used to visit retail directory 400.

At step 806, the user selects web sites to add to personal retail list 506. As noted above in connection with FIG. 4, the user may make this selection by "clicking" on an "add" button 410. In response to the user's selection, an entry for the selected web site is inserted into the user's personal retail list 506 (step 808). As shown in FIG. 8, the step of inserting this entry may be performed by copying an entry from retail directory 400 to personal list 506 (e.g., by copying the data over the Internet).

After a user has selected a web site from retail directory 400 and the appropriate entry has been inserted into personal retail list 506, the user may invoke the integrated shopping feature 300 in order to visit those sites in personal retail list 506 (including the sites that the user just added at steps 802–808). When integrated shopping service 300 is invoked, links to the web sites in the user's personal retail list 506 are rendered (step 810). (FIG. 3 shows an example of the integrated shopping service 300 rendering links to sites that are listed in personal retail list 506). In order to visit one of the sites, the user clicks on the links (step 812), at which point the page for the selected site is opened (step 814). The user is then able to browse the selected site and shop for content (step 816).

Example: Use of Integrated Shopping Service to Purchase eBooks

Figure 9:
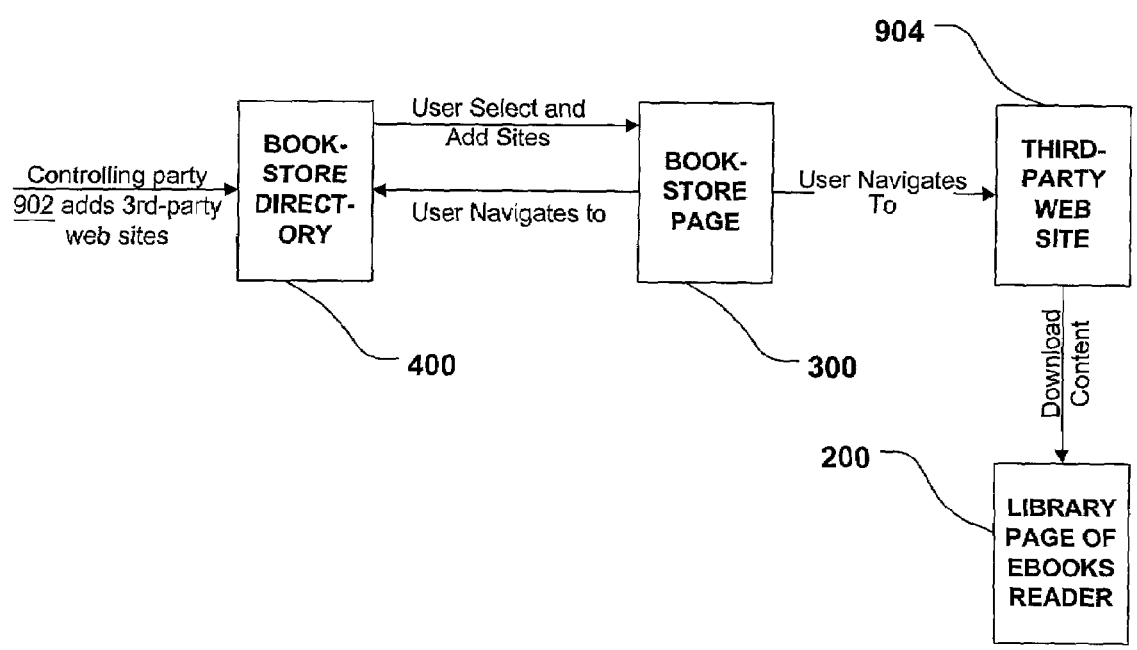
FIG. 9 is a block diagram of aspects of an exemplary system architecture according to aspects of the invention, indicating an exemplary flow of information through the architecture.

FIG. 9 shows an example in which the present invention is used to purchase electronic books (eBooks) from within an eBooks rendering software application.

As shown in FIG. 9, a controlling party 902 adds third-party web sites to retail directory 400. In this example, retail directory 400 is a "bookstore directory," which lists retail web sites that distribute eBooks. Controlling party 902 is the party that controls the constituency of bookstore directory 400. For example, controlling party 902 may be the manufacturer and/or distributor of the application 200 which uses integrated shopping service 300. As another example, controlling party 902 may be a different party that has been engaged to control which web sites may be listed in bookstore directory 400.

A user may navigate to bookstore directory 400—e.g., by using a stand-alone browser, or by using integrated shopping service 300 (which, as noted above, may include a browser). The user views the bookstore directory 400 and chooses web sites from bookstore directory 400 to add to his or her personal retail list 506 (shown in FIG. 5). In response to the user's selection, bookstore directory 400 transmits to the user's machine data (e.g., the "entries" shown in FIGS. 6 and 7) that correspond to the user's chosen web sites. These choices are stored in personal retail list 506 and are displayed on the user interface of integrated shopping service 300, which, in this example, is a "bookstore page."

From bookstore page 300, the user navigates to a "third-party web site." The third-party web site is one of the sites displayed on the bookstore page. For example, and referring for the moment back to FIG. 3, link 304 ("Barnes & Noble.com") is an example of a third-party web site. As previously noted, integrated shopping service 300 (which is bookstore page 300, in this example) includes or employs a browser (or equivalent browsing functionality), which allows a user to navigate to the third-party web sites from within the application of which integrated shopping service/bookstore page 300 is a part. The user then uses the third-party web sites to shop for content. In this example, the third-party web sites are electronic bookstores that provide eBooks. Thus, the user can purchase eBooks from the third-party web sites from within the eBook-reading application, and download such eBooks to his or her computing device.

Once the eBooks are downloaded to the user's computing device, a list of downloaded eBooks is displayed by the rendering application. For example, the purchased eBooks may be displayed on a "library page," such as that shown in FIG. 2. The user may then use the eBook-reading application to open and render the eBooks.

Branding

Branding represents a business relationship between two or more parties, such as a software manufacturer and an electronic retailer, distributor or wholesaler. For example, the software manufacturer may create a content-rendering application (e.g. content-rendering application 200, described above), and may "brand" the application with information indicative of a retailer who sells content that can be rendered on such an application. The nature of this "branding" may take various forms, examples of which are described below.

Figure 10:
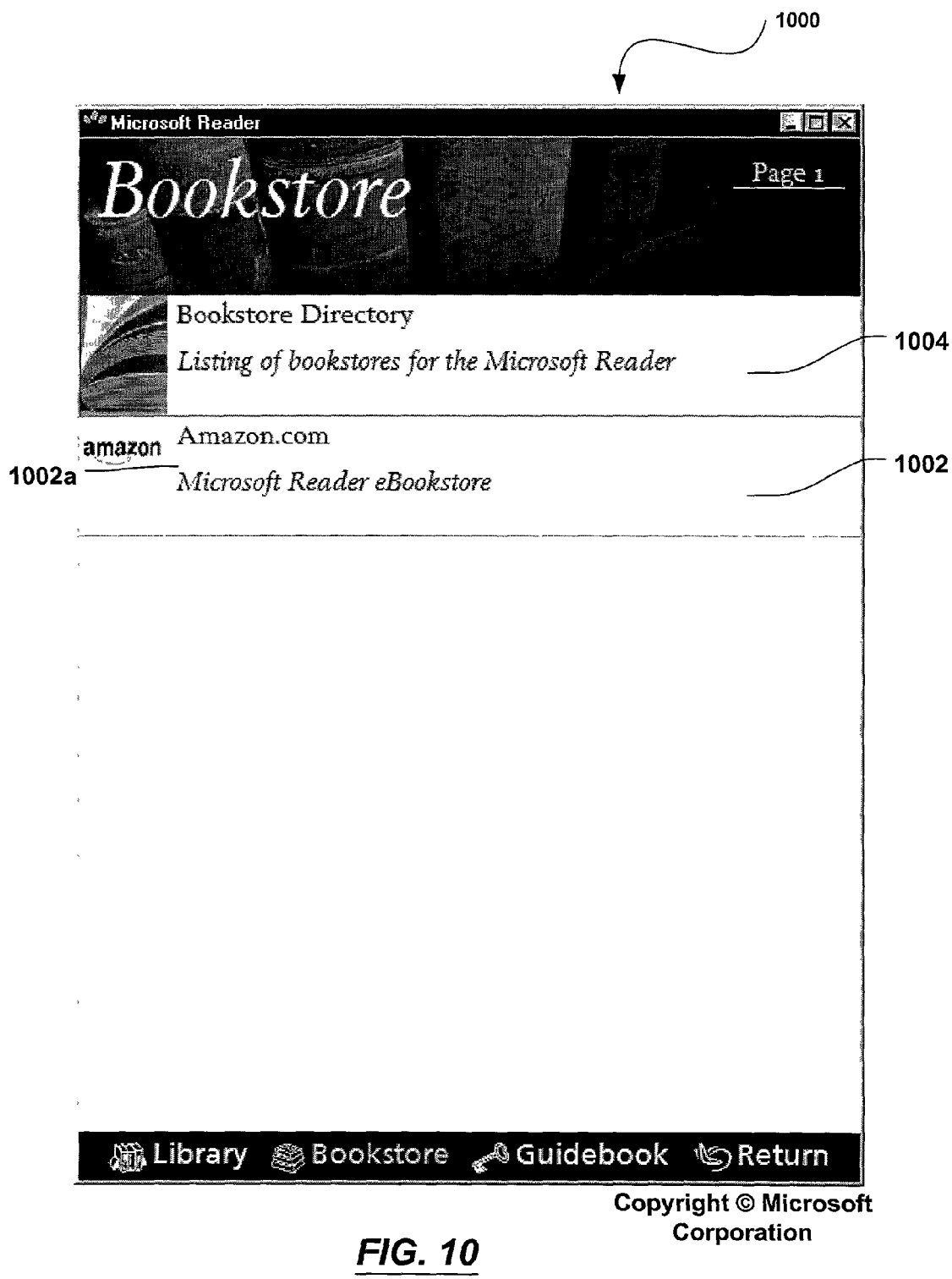
FIG. 10 is a diagram of an exemplary form of branding.

FIG. 10 is an example of a form that branding of a content-rendering application might take. The content-rendering application includes an integrated shopping service 1000 (which is analogous to integrated shopping service 300, described above in connection with FIG. 3). Integrated shopping service 1000 displays a list of retailers that provide content. One of the retailers is Amazon.com. The Amazon.com web site link 1002 is displayed most prominently, that is, the Amazon.com web site link 1002 is displayed immediately after link 1004 to the bookstore directory. This is an example of branding the rendering application with the Amazon.com information, since a link to the Amazon.com web site is prominently featured on a list of web site links in the integrated shopping service. Additionally, Amazon.com's logo 1002a is displayed beside the Amazon.com link 1002. Displaying Amazon.com's logo 1002a may be part of the branding of the rendering software with the Amazon.com information.

Figure 11:
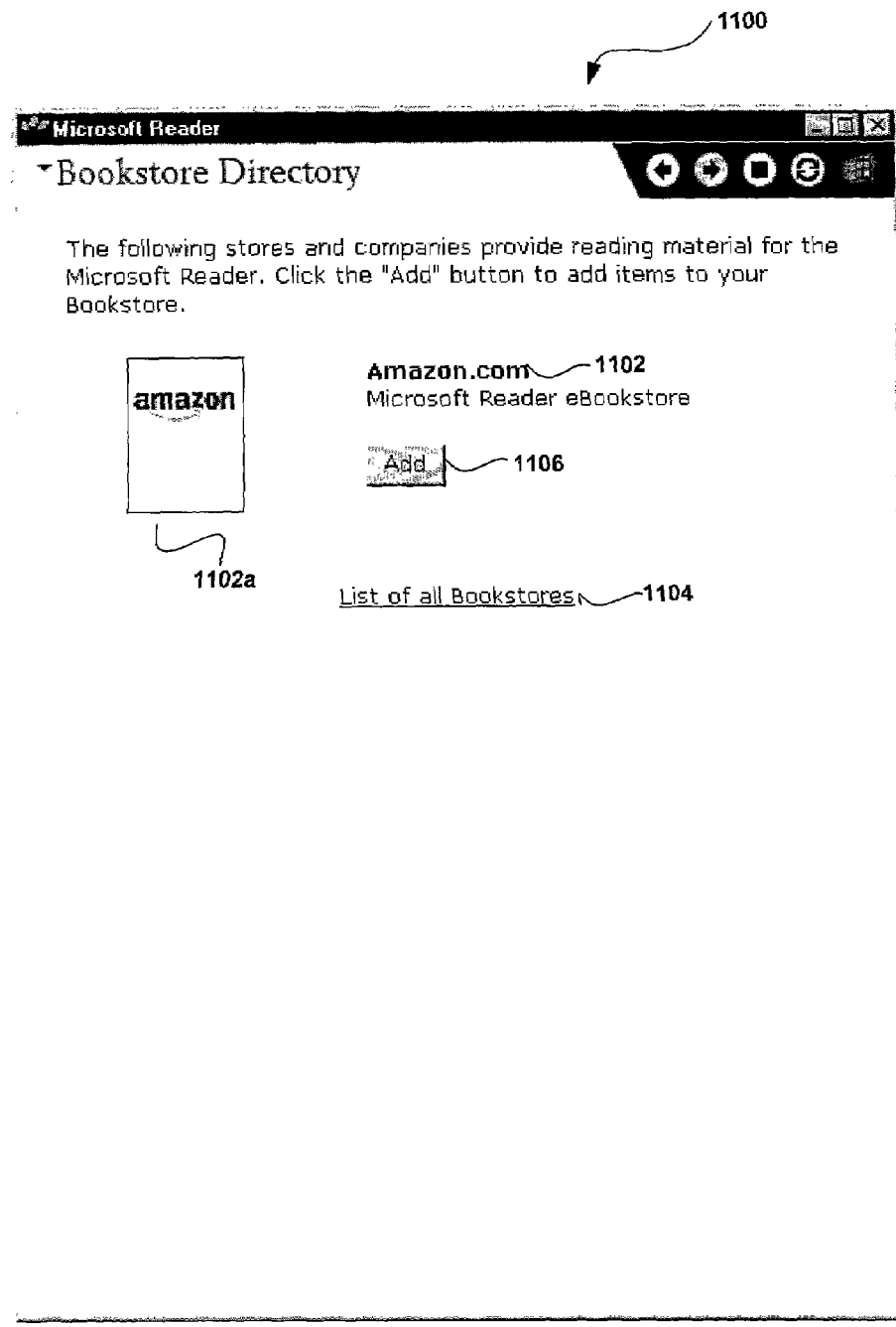
FIG. 11 is a diagram of a second exemplary form of branding.

FIG. 11 depicts a second example of branding. In FIG. 11 bookstore directory 1100 (which is a type of retail directory 400, described above in connection with FIG. 4) shows the Amazon.com logo 1102a and name 1102 featured prominently on a page displaying no other bookstores, thereby encouraging users to add the Amazon.com web site link to the user's personal retail list by clicking on "Add" button 1106. A user must click link 1104 ("List of all Bookstores") to see other retailers whose links the user could add to the user's personal retail list. The user is thus exposed to the branded retailer's web site before being exposed to other sites in the directory, and, in this way, is encouraged to add the branded retailer web site link 1102 and logo 1102*a* before adding links to other retailers' web sites.

The software is branded by depositing branding information on the computing device on which the software is installed. For example, if a user downloads content-rendering software from Amazon.com, the Amazon.com web site may cause information to be sent to the user's computing device. The information sent to the user's computing device may result in some type of branding of the software, such as that demonstrated in FIGS. 10 and 11 above.

Figure 12:
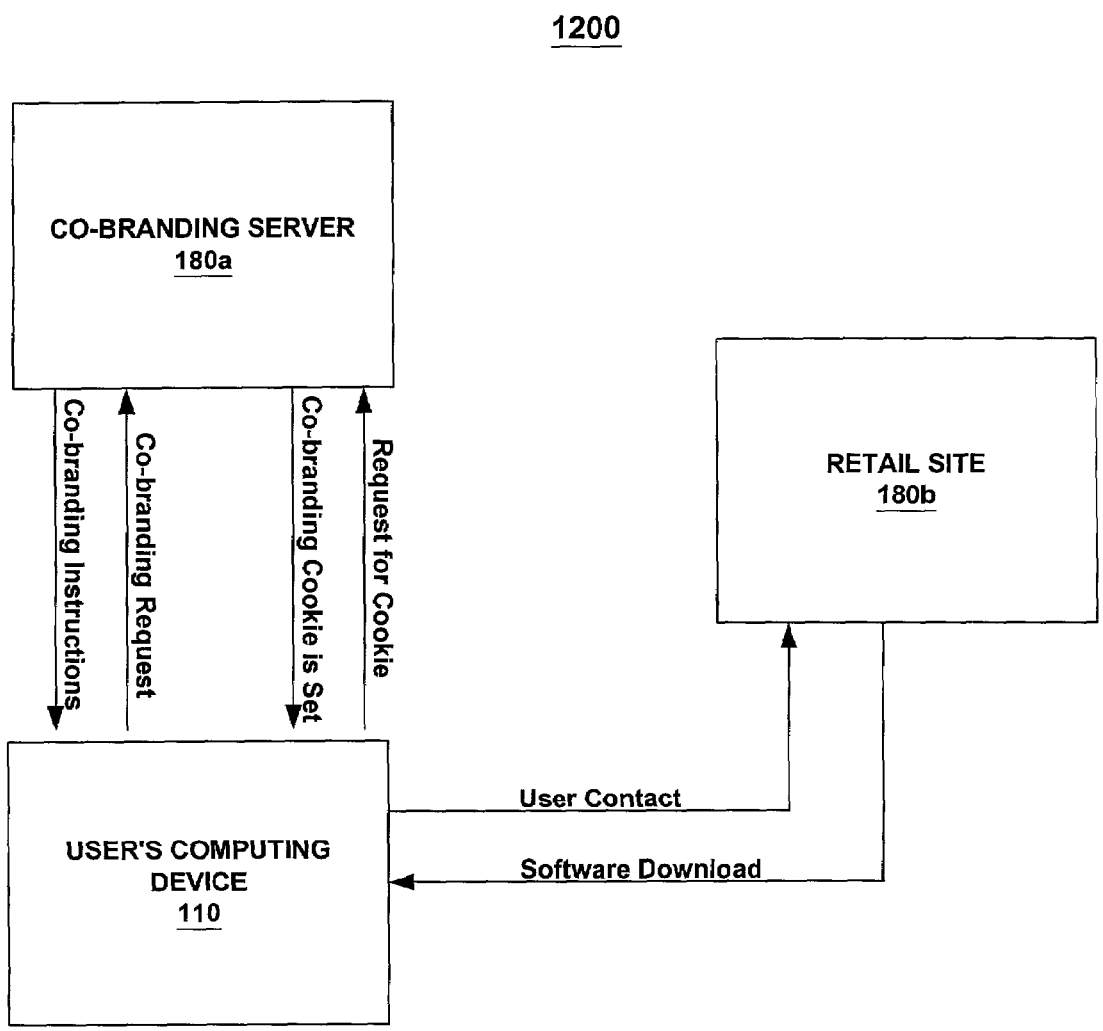
FIG. 12 is a block diagram of aspects of an exemplary system architecture for branding according to aspects of the invention, indicating an exemplary flow of information through the architecture.

FIG. 12 depicts an exemplary architecture for branding. The user contacts the retail site's download web page (FIG. 13) and may click on a link 1304 to initiate download of the software. Contacting the retail site's download page may also cause the user's computing device 110 to contact the branding server 180*a* and to request that the branding server 180*a* set a cookie which identifies retail site 180*b* as the site from which the software was downloaded.

The branding server 180*a*, in response sets a cookie on user's computing device 110 that indicates the site 180*b* from which the software was downloaded. Subsequently, the user's computing device 110 contacts the branding server 180*a*. When the user's computing device 110 contacts the branding server 180*a*, the cookie set by the branding server 180*a* is sent to the branding server 180*a* by the user's computing device 110. Based on the cookie, the branding server 180*a* provides branding instructions to the user's computing device 110. These instructions are stored on the user's computing device 110 and executed by the user's computing device 110. These instructions provide the branding of the software.

Figure 13:
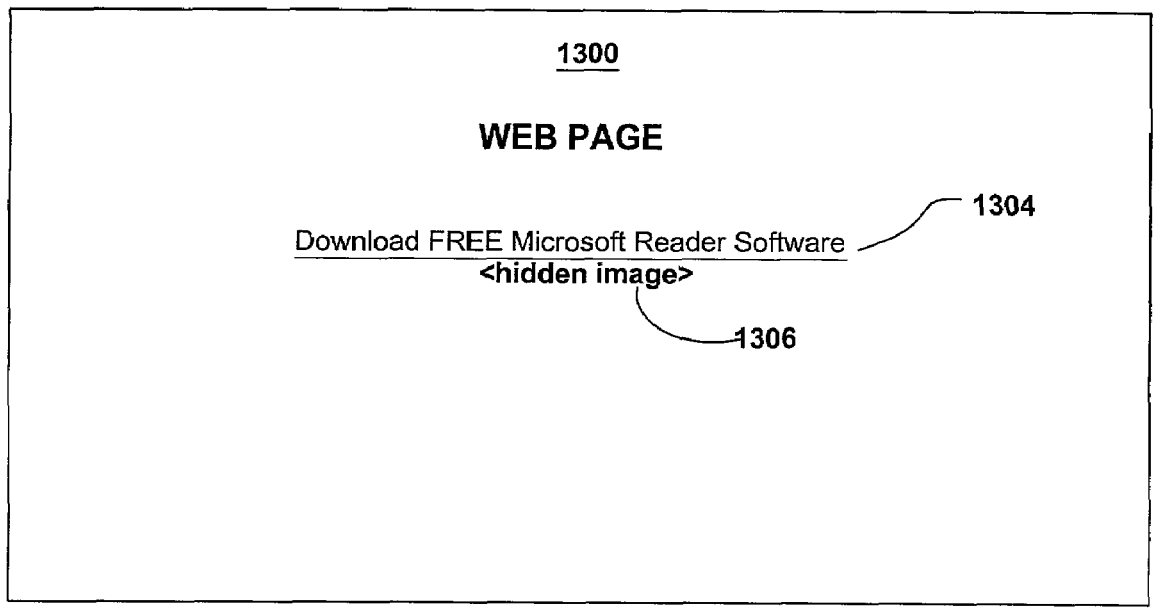
FIG. 13 is a diagram of an exemplary user interface from which software may be downloaded

FIG. 13 illustrates an exemplary download web page 1300 from which software may be downloaded. When the user clicks on link 1304, "Download FREE Microsoft Reader Software", the software download process is initiated. Download web page 1300 includes, in addition to link 1304, a hidden image, such as, for example, "http://brand.microsoft.com/setdownloadid.asp?ID=12345". When a user views download web page 1300, computing device 110 automatically makes a request to the specified URL (universal record locator) to retrieve the image. The purpose of this image is to generate a HTTP request to the branding server, and its purpose is not to visually contribute to the page. Therefore, we refer to the image as a "hidden image". In an alternate embodiment, computing device 110 generates a request to the URL of the branding server when the user clicks on download link 1304. The hidden image taginstructs the user's computing device 110 to contact the branding server 180*a* and request branding server 180*a* to set a cookie on computing device 110. Based on the brand criterion contained in the URL to the hidden image ("ID=12345" in the example given) branding server 180*a* sets the cookie (corresponding to identifier "12345" in the example), on computing device 110.

It should be noted that in a preferred embodiment, the brand cookie can only be set once. For example, if a user goes to Amazon.com and has a Barnes & Noble branding cookie already, the Barnes & Noble cookie will remain intact. Thus the brand should not change as a result of the user visiting another retail site or sites.

The web site 1300 is referred to as the downloading web site and, for the purposes of the exemplary embodiment discussed herein, the software is branded with respect to downloading site 1300, (i.e., the downloaded software will display branding information or characteristics that relate to downloading site 1300 when the downloaded branding instructions have been executed by the user's computing device). It should be understood, however that branding may be based on criteria other than the identity of the download site—e.g., the download site may have an agreement with a third-party entity to distribute software that is branded for that third-party entity. Additionally, at the time the download web site is viewed, or alternately at the time of download of the software, the instructions executed by the download web site 1300 may cause the deposit of branding information on the user's computing device 110. In one example (as discussed above in connection with FIG. 12), a hidden image in the downloading web site 1300 instructs an external branding server 180*a* to deposit a "cookie" on the user's computing device 110, which is later uploaded to the branding server to complete the branding process. It should be understood that web site 1300 may be any user interface site from which software may be downloaded and that link 1304 may be labeled with any appropriate message without departing from the spirit and scope of the invention. In addition, while in the exemplary embodiment, a cookie is set on user's computing device 110, any mechanism whereby branding criteria is stored on user's computing device 110 is contemplated by the invention.

Figure 14:
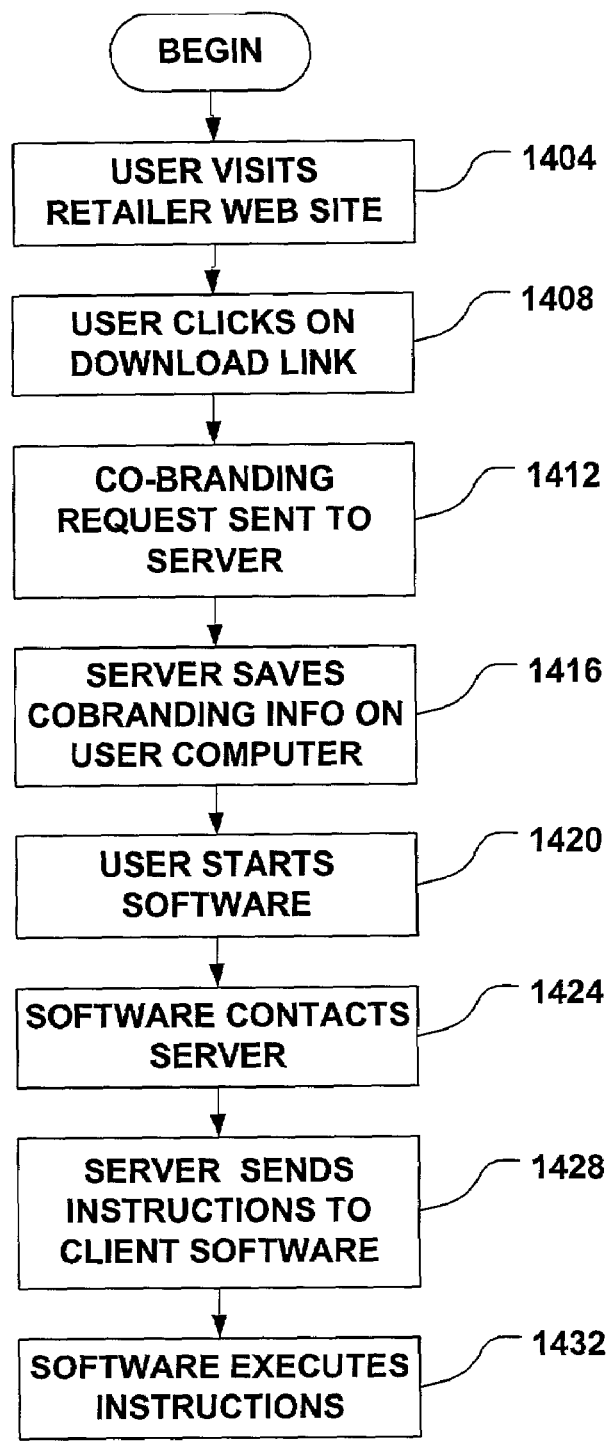
FIG. 14 is a flow diagram of a process of branding in accordance with aspects of the invention.

Referring now to FIG. 14, an exemplary process is shown whereby software is branded based on the web site from which the software is downloaded. At step 1404, a user visits an Internet web site (e.g., a content-vending web site, such as Amazon.com) using a browser. The browser may be the INTERNET EXPLORER browser, the NETSCAPE NAVIGATOR browser, or any other suitable browser. Additionally, although the Internet is specifically mentioned, any communications network suitable for the download of content-rendering software may be employed.

The web site to which the user has navigated may display a link from which content-rendering software can be downloaded (e.g., the "Download FREE Microsoft Reader Software" link 1304 shown in FIG. 13 and discussed above). When the user clicks on link 1304 at step 1408, a download of content-rendering software to the user's computing device is initiated. Although from the viewpoint of the user, the software is being downloaded from the site to which the user has navigated (e.g. the Amazon.com web site), in a preferred embodiment the software is actually downloaded from the content-rendering software manufacturer's server. In the HTML code that the browser uses to create and display a web page, the link to "download software" points to a software manufacturer's server as the source of the software. Thus all copies of the software executable originate from a master copy maintained by the software manufacturer. This arrangement is preferable (but not mandatory) because it simplifies the process of updating the software. Only one copy (the manufacturer's copy) must be maintained. In contrast, if each retailer had a copy of the software and that copy was used for the software download, the manufacturer would have to send each retailer a new version of the software every time the software changed.

A hidden image (e.g., hidden image 1306, shown in FIG. 13) may also exist on the web page such that data and instructions exist which are executed when the user views download page 1300 or alternately, clicks on download link 1304. The hidden image may point back to the software manufacturer's server. In a preferred embodiment, when the user views download web site 1300 the user's computing device is instructed to send a request at step 1412 to the software manufacturer's branding server to deposit information indicative of the branding criteria on the user's computing device. In a preferred embodiment information is deposited on the user's computing device by setting a cookie on the user's machine. Specifically, the URL of the hidden image may contain the relevant branding data that is transmitted to the branding server (i.e., the identity of the retail site from which the software download was initiated, or other branding criteria), and the branding server may set the cookie in accordance with the particular data received. This data is transmitted as part of the URL to the branding server.

A cookie is data created by a web server that is stored by the web browser (Internet Explorer or Netscape Navigator) on a user's computer. The branding cookie may contain a site identifier that tells the branding server the site from which the content-rendering software was downloaded and may specify the server name. The cookie may also include an identifier that is unique for the cookie and may contain the URL for which the cookie is valid. Typically, whenever a browser encounters the URL specified in the cookie, it sends the cookie associated with that URL to the web server. Although in a preferred embodiment, a cookie is used to capture the download site, or other information on which branding is based, any suitable mechanism may be employed to capture this information on the client computer or on the server computer without departing from the spirit and scope of the invention.

In one embodiment, the branding step is executed after the software is downloaded. At some point subsequent to the download, at step 1424, the user's computer contacts the branding server. In one embodiment, the branding server also functions as an "activation" server, and branding is performed at the time of activation. An activation server and the process of "activating" a rendering application are described in U.S. patent application Ser. No. 09/604,564, titled "System and Method for Activating a Rendering Device In a Multi-Level Rights-Management Architecture" filed Jun. 27, 2000. It is convenient to perform branding at the time of activation because all users of the rendering application are encouraged to perform the activation process, so linking the branding and activation processes increases the likelihood that the branding operation will actually take place. However, it will be understood that all that is required is that the user contacts the branding server at some point, whether or not branding is linked with activation.

When branding and activation are linked as described above, the user may be prompted to activate the content-rendering application (e.g., with a yes/no dialog box that offers the user the option to activate the application at the time the application is started). If the user chooses to activate, the content-rendering application establishes a connection with the manufacturer's activation server (which in this example is also the branding server). If branding is not associated with the activation process, then contact with the branding server is initiated under other circumstances. For example, the initial start-up of the rendering application could initiate contact with the branding server.

At the time that the user's machine contacts the branding server, the user's machine uploads to the branding server the cookie that was deposited at step 1416. The branding server inspects the cookie and sends the client the appropriate branding instructions at step 1428. The particular instructions received are based on the information contained in the cookie. For example, in the case where the cookie indicates the web site from which the software download was initiated, the branding server sends the user's machine instructions based on the download site. (For example, if the software was downloaded from retail site A, the branding server may provide instructions to prominently feature site A in the software's integrated shopping feature, or to display a logo for retail site A, etc.). The branding server sends appropriate branding instructions to the user's computer at step 1428. The instructions are then executed by the user's machine at step 1432.

It should be noted that because the branding server is sent the branding cookie each time the client computer connects to the branding server, branding logic, logos, etc, can be updated at any time. For example, new participating distributors, retailers or wholesalers can be supported without modification or disabling current brand behaviors.

Order of Listing of Partners in the Retail Directory

One type of branding in a preferred embodiment is "premium placement" of a retailer in an integrated shopping service. For example, when an application (e.g., application 200, discussed above in connection with FIG. 2) includes an integrated shopping service 300 (discussed above in connection with FIG. 3), that integrated shopping service 300 may list links to various web sites. However, the retail site with which the software is branded may be displayed more prominently in the list (e.g., first on the list, in larger type, etc.). This prominent placement may be achieved based on the site identifier (e.g., site ID 602a, in FIG. 6) in the data that represents the web site. For example web sites may be listed by integrated shopping service 300 in an order based on their site Ids, the retail site with which the application is branded by being given the lowest site ID. Such premium placement may represent a business relationship between retailer and software manufacturer.

In one embodiment, a two tiered list is maintained in which the first three characters of the site ID are "000" for premium bookstore partners and "100" for second tier bookstore partners. The list of bookstores displayed in Bookstore Directory is displayed in ascending order by site ID so that all premium bookstores appear in the list before any second tier bookstore partners. Within the list of premium bookstores the premium bookstores may appear alphabetically by name by having the next X characters of site ID be the name of the bookstore, or alternately be another code representing subcategories.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of branding; a computer program comprising the acts of:

receiving a triggering event registering a computer program that renders encoded digital content, wherein registering the program indicates that a first copy of the computer program has been downloaded to a first computing device from an originating distributor, wherein the originating distributor is that distributor of the renderable digital content from which the first copy was downloaded and that said first copy is to be branded with information associated with the originating distributor, the computer program further comprising an embedded limited-function web browser, wherein the embedded limited-function web browser provides a content-shopping feature that displays a directory of distributors comprising the originating distributor and other non-originating distributors and automatically connects to an Internet website of a selected distributor from the directory;

transmitting data identifying the originating distributor;

receiving acknowledgement from said first computing device; and providing branding instructions to said first computing device in response to receiving the acknowledgement, said branding instructions comprising placing the originating distributor first in the directory, a supplier of said computer program controlling which renderable digital content-providing distributors are displayed in said directory based on agreements between said supplier and said content-providing distributors.

2. The method of claim 1, wherein said providing act comprises:

providing instructions to said first computing device which cause said first copy of said computer program to display a logo associated with said originating distributor.

3. The method of claim 1, wherein said providing act comprises:

providing instructions to said first computing device which cause said first copy of said computer program to display a link to a web site associated with said originating distributor.

4. The method of claim 3, wherein said act of providing branding instructions further comprises:

providing instructions to said first computing device which affect the placement of said link among other links.

5. The method of claim 1, wherein said directory includes a link to a web site associated with said originating distributor.

6. The method of claim 5, wherein said act of providing a directory to said first computing device comprises:

providing a first page which includes said link to said web site, wherein said web site is a first web site; and providing a second page which includes one or more links to one or more second web sites different from said first web site.

7. The method of claim 6, wherein said first page includes a link to said first web site and does not include any other links to any other web site.

8. The method of claim 1, further comprising the acts of:

receiving an indication that a second copy of said computer program has been downloaded to a second computing device and that said second copy is to be branded with a second distributor different from said originating distributor;

transmitting identifying the second distributor to said second computing device; receiving acknowledgment from said second computing device; and providing second branding instructions to said first computing device, said second branding instructions being different from said first branding instructions.

9. The method of claim 1, wherein said transmitting act comprises: setting a cookie on said first computing device.

10. The method of claim 9, wherein said act of receiving said acknowledgment from said first computing device comprises receiving said cookie.

11. The method of claim 1, wherein said originating distributor is a retailer.

12. The method of claim 1, wherein said originating distributor is a wholesaler.

13. A computer-readable medium having computer-executable instructions to perform the method of claim 1.

14. A method of branding; a computer program that has been provided to a first computing device, comprising the acts of:

receiving information indicative of a distributor of encoded digital content to be rendered by the computer program, wherein the computer program comprises encoded digital content-rendering software and an embedded limited-function web browser and content shopping program that displays a directory of distributors and automatically connects to an Internet website of a selected distributor from the directory;

providing branding data based on said received information to a first computing device for durable storage on said first computing device in response to a triggering event comprising registration of the computer program;

following said act of providing branding data, receiving said stored branding data from said first computing device; and in response to receiving said stored branding data, providing branding instructions to said first computing device based on said received branding data, said branding instructions comprising placing an originating distributor first in a list of electronic content-providing entities displayed on said first computing device by the computer program, a supplier of said computer program controlling which content providing entities are displayed in said list based on agreements between said supplier and said content-providing entities and wherein the originating distributor comprises an entity of the content-providing entities from which the computer program was received.

15. The method of claim 14, wherein said receiving act comprises:

receiving said information indicative of a first entity from a second entity identified in an image hidden within a web page.

16. The method of claim 15, wherein said second entity causes a cookie to be set on said first computing device.

17. The method of claim 16, wherein said cookie contains information specific to a branding device.

18. The method of claim 16, wherein said cookie contains information identifying said branding instructions to be downloaded to said first computing device.

19. The method of claim 16, wherein said act of providing branding data further comprises sending said cookie from said first computing device.

20. The method of claim 19, wherein said cookie comprises information indicative of said first entity.

21. The method of claim 19, wherein said cookie comprises information associated with a second computing device.

22. The method of claim 14, further comprising receiving a fee from said first entity as a pro-condition for providing either said branding data or said branding instructions.

23. The method of claim 14, wherein said act of providing branding instructions comprises instructing said first computing device as to the manner in which a link to a network address is to be displayed on a list of network addresses.

24. The method of claim 23, further comprising limiting the set of said network addresses on said list.

25. The method of claim 23, further comprising providing data on a list of network addresses automatically.

26. A computer-readable medium having computer-executable instructions to perform the method of claim 14.

27. A method for distributing a variation of software through one of a plurality of entities, comprising:
provide a standardized version of software from a first entity and an indication that said standardized version of software is to be branded, wherein the indication comprises a triggering event comprising registration of a content-rendering program, said first entity comprising a distributor of content to be rendered by a content-rendering program, the content-rendering program comprising a. content-shopping feature for purchasing content to be rendered; and
providing a customized version of said software as a function of one of a plurality of entities, said customized version of said software being branded by placing said first entity first in a list of content-providing entities displayed in the content-shopping feature of said content-rendering program, a supplier of said computer program controlling which content-providing entities are displayed in said list based on agreements between said supplier and said content-providing entities.

28. A system for branding a computer program comprising:
a first computing device which comprises:
a memory which stores branding instructions for one of a plurality of entities;
a network interface communicatively coupled to a computer network; and
logic which communicates one of a plurality of sets of branding instructions to a second computing device through said network interface in response to a triggering event comprising registration of a content-rendering program, said one of said plurality of sets of branding instructions comprising instructions to place a first entity first in a list of content-providing entities displayed in a content-shopping feature of a content-rendering program, a supplier of said computer program controlling which content-providing entities are displayed in said list based on agreements between said supplier and said content-providing entities.

29. The system of claim 28, wherein said logic causes said instructions to be stored on a second computing device

* * * * *